United States Patent [19]
Danielsson et al.

[11] Patent Number: 5,697,737
[45] Date of Patent: Dec. 16, 1997

[54] SUPPORT PAD FOR DRILL

[75] Inventors: Ake Danielsson, Gävle; Torsten Blomberg, Sandviken, both of Sweden

[73] Assignee: Sandvik AB, Sandviken, Sweden

[21] Appl. No.: 526,390

[22] Filed: Sep. 11, 1995

[30] Foreign Application Priority Data

Sep. 12, 1994 [SE] Sweden .................... 9403024

[51] Int. Cl.$^6$ .................................... B23B 51/00
[52] U.S. Cl. ................... 408/83; 175/408; 408/81; 408/200
[58] Field of Search .................. 408/81, 83, 200; 175/325.1, 408

[56] References Cited

U.S. PATENT DOCUMENTS 3,751,177  8/1973  Faber ........................ 408/200

FOREIGN PATENT DOCUMENTS 251932  12/1987  Germany .................... 408/200

Primary Examiner—Steven C. Bishop
Attorney, Agent, or Firm—Burns, Doane, Swecker & Mathis, L.L.P.

[57] ABSTRACT

A drill includes support pads for supporting and guiding the drill in the drill hole. The support pads are formed as parallelepiped-shaped cemented carbide bodies which each have two wing-shaped protrusions on their longitudinal sides. In a corresponding way, the drill head of the drill includes recesses with two bulged parts on the long sides. This gives the support pad a determined axial position and strengthens the support pad at the weakening caused by the central hole. Further, the support pad can be turned half a revolution if one of its ends becomes damaged since the end spaces do not have to function as abutment surfaces.

18 Claims, 2 Drawing Sheets

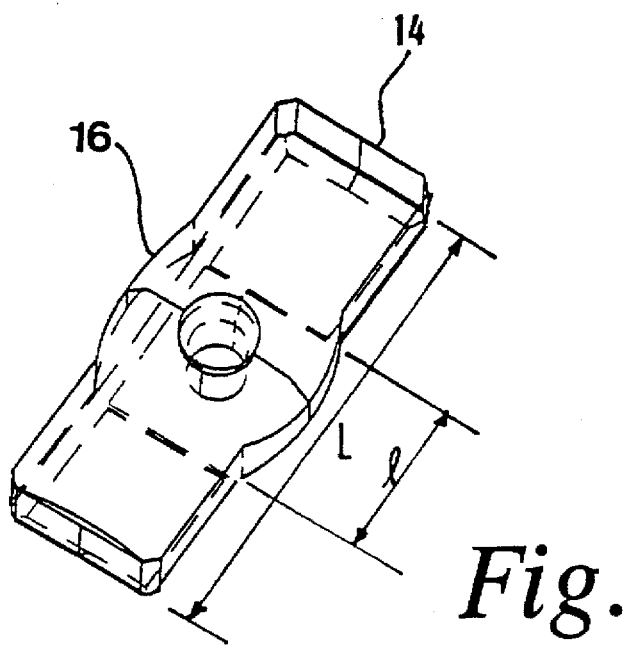
*Fig. 4*
*Fig. 5*
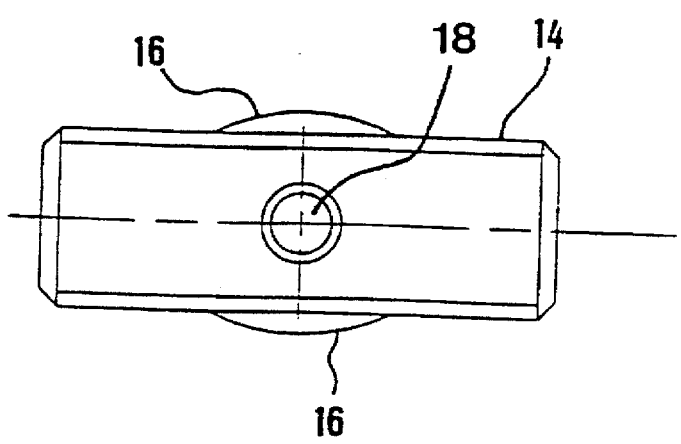
*Fig. 6*
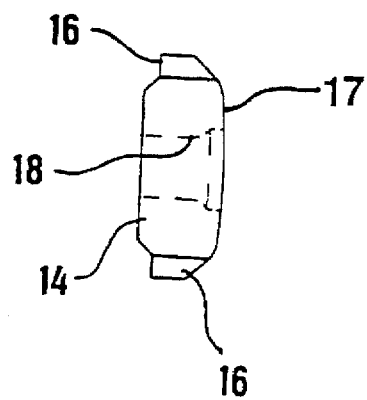

SUPPORT PAD FOR DRILL

FIELD OF THE INVENTION

The present invention relates to drills and more particularly to a support pad for a drill, such as a metal drill. This drill includes one or several support pads arranged to support and to guide the drill in the drill hole. An example of a typical application for the support pad according to the invention is a drill tool of the ejector type. Advantageously, the support pad may be used for so called BTA-drilling.

BACKGROUND OF THE INVENTION

In previously known drills, the support pads are fixedly joined with the drill by, for example, soldering which causes some inconveniences. When the support pads are fixed, binding between the support pads and the hole may easily occur. In an attempt to avoid this problem to the extent possible, the pads can be made with a small conicity so that their distance from the drill axis diminishes somewhat in the rearward or backward direction, away from the tip.

However, this causes the pressure on the support pad to become concentrated on the front part of the pad, which is thus exposed to increased wear and greater heating. Another disadvantage of the aforementioned fixed support pads is the difficulty associated with obtaining full abutment between the pad and the drill in a tangential direction. Even if the drill diameter is constant, it is difficult to achieve a fit of the pad which produces full contact.

Another obvious disadvantage with fixed support pads is that if one of the pads becomes damaged, the whole drill must be replaced.

According to Swedish patent document SE-C-347 450 (and U.S. Pat. No. 3,751,177), an attempt has been made to address these disadvantages by replacing the fixed support pads with so called swaying support pads. In accordance with the construction disclosed in this document, the pads are movably mounted in the drill so that they can turn both around a longitudinal axis and around a lateral axis. The ability of the pads to turn around the longitudinal axis is accomplished by an articulated joint included in the drill with a convex cylindrical sliding surface, which abuts against a corresponding convex sliding surface that forms a recess in the drill. These sliding surfaces have a longitudinal axis adjacent and somewhat outside the peripheral surface of the support pad. The outer surface of the joint is substantially flush with the drill's peripheral surface. Further, the joint is fastened in the drill by a screw. To permit the motions of the joint, there is a spring washer placed between the joint and the screw head.

It has been discovered that this construction is susceptible of some disadvantages. In one respect, the construction is relatively expensive and complicated to produce. Further, it has been found that it is very difficult to adjust it to different diameters. Furthermore, the construction is fragile and easily cracked, both in production and during use. When the support pad is damaged at its exposed short side, it is necessary to replace the support pad and the cradle.

SUMMARY OF THE INVENTION

In view of the foregoing, it would be desirable to produce a drill which does not possess complicated support pad accommodating constructions, but which instead provides support pad fixations that comprise as few separate construction details as possible.

It would also be desirable to provide a support pad which is strong and durable, and which can be produced entirely of cemented carbide.

It would be further desirable to provide a drill whose support pads make adjustment of different diameters possible.

A need also exists for a drill whose support pads are easy to position and easy to machine.

A further need exists for a support pad that is designed in a way that allows damaged support pads to be reused.

To address the foregoing needs, the present invention provides a surprisingly easy solution in which the support pads are provided with two wing-like protrusions. More particularly, in accordance with one aspect of the invention a support pad for a drilling tool comprises a cemented carbide body of a substantially parallelepiped shape with two longitudinal sides and two short sides. Each respective longitudinal side has a wing-shaped protrusion extending therefrom.

According to another aspect of the invention, a drill for drilling a drill hole in a work pieces comprises a drill head, at least one cutting insert seat provided on the drill head for accommodating a cutting insert, a support pad seat provided on the drill head, and a support pad accommodated in the support pad seat for supporting and guiding the drill. The support pad is comprised of a cemented carbide body of a substantially parallelepiped shape with oppositely positioned longitudinal sides, and a protrusion extends laterally from each of the longitudinal sides.

BRIEF DESCRIPTION OF THE DRAWING FIGURES

For illustrative but non-limiting purposes, a preferred embodiment of the present invention will be described with reference to the accompanying drawing figures in which like elements are designated by like reference numerals and wherein:

FIG. 4 is a perspective view of a support pad according to the present invention;

FIG. 5 is a top view of the support pad shown in FIG. 4; and

FIG. 6 is a side view of the support pad shown in FIG. 4.

DETAILED DESCRIPTION OF PREFERRED EMBODIMENT

Figure 1:
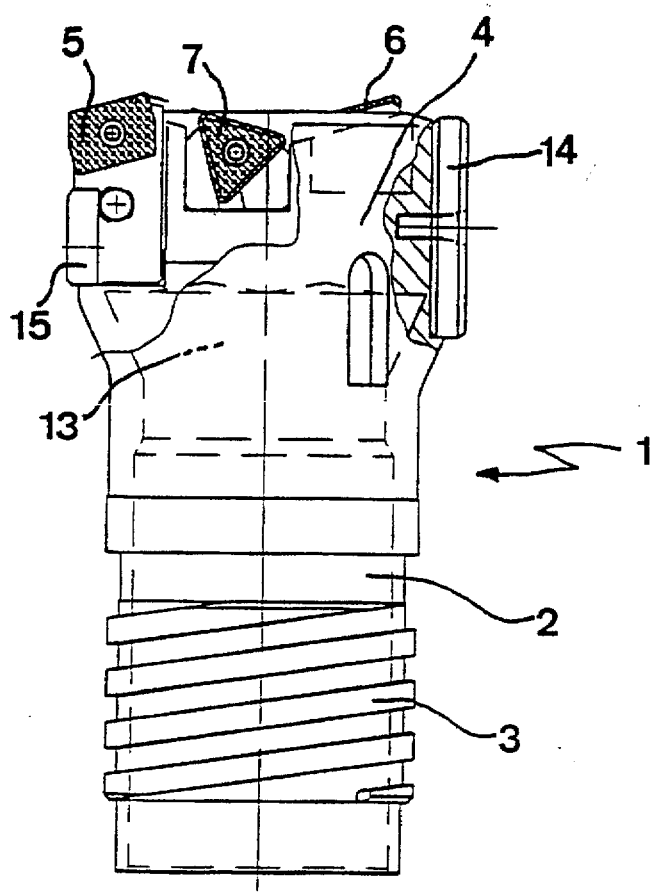
FIG. 1 is a side view, partially in section, of a drilling tool according to the present invention.

As seen initially with reference to FIG. 1, a drilling tool 1 of the ejector type is provided with a shaft portion 2. The shaft portion 2 is provided with an outer thread 3 which, in a known way, is intended to threadably engage a retaining outer tube (not shown).

The top part, crown or head of the drilling tool is provided with three cutting insert seats, which radially inwardly comprise a peripheral cutting insert 5, an intermediate insert 6 and a central insert 7. Each of these inserts is carried in a cartridge 8, 9 and 10, respectively. However, the specific shapes of the cartridges and the inserts, respectively, do not constitute an essential feature of the present invention, and the inserts can even for instance be soldered in the drill head in accordance with the disclosure contained in Swedish patent application No. 9402036-9.

The peripheral insert 5 forms the diameter of the hole in the workpiece that is machined. The adjacent central insert 7 overlaps the central axis of the drill, as no remaining core is desired. During rotation, the orbit of the cutting edge of the intermediate insert 6 overlaps with the cutting edges of both the peripheral insert 5 and the intermediate insert 6 to thereby obtain a continuous cutting line from the central axis to the periphery.

Two chip flutes open on the top side of the drill; one larger chip flute 11 that is common for the peripheral insert 5 and the central insert 7, and another smaller chip flute 12 for the intermediate insert. Preferably, the opposite lower ends of these chip flutes 11, 12 open in a turned-up inner chip space 13, which has the form of a frusto-cone with the bottom side turned upwards in the direction towards the top side of the drill. According to the illustrated embodiment, the peripheral cartridge 8 is provided with a supporting shim 15.

To support and guide the drill, two support pads 14 comprised of a cemented carbide body are provided. The support pads 14 each have a substantially parallelepiped basic shape with a rectangular or generally rectangular plan view. The pads 14 are defined by oppositely positioned longitudinal sides and oppositely positioned shorter lateral sides.

Each of the support pads 14 is formed with two wing-shaped outgrowths 16, one on each longitudinal side of the pad. These protrusions, outgrowths or "wings" 16 each have substantially the form of circular segments, which basically constitute mirror images of one another. Thus, the outer contour of each "wing" 16 essentially corresponds to a curved line and the "wings" 16 each extend laterally or radially outwardly with respect to the longitudinal dimension of the support pad 14. The longitudinal extension or length 1 of each of the "wings" 16 suitably constitutes between ⅕ and ⅗ of the total length L of the long side of the pad 14, preferably between ¼ and ½ of the total length L of the long side of the pad. The "wings" 16 are positioned intermediate the lateral sides of the pad, preferably at the center of the longitudinal extent of the support pads 14 as shown in FIG. 4.

As seen with reference to FIG. 6, the radial outer side 17 of each support pad 14 is somewhat rounded to abut against the drilled hole in the workpiece. To avoid potential jamming and binding, the edge lines of the support pads 14 are somewhat bevelled. Also the protrusions or "wings" 16 are suitably made somewhat thinner than the thickness of the support pad. Further, the support pad 14 is provided with a centrally located through hole 18 for fixing the support pad in the drill tool by a suitable locking screw.

Figure 3:
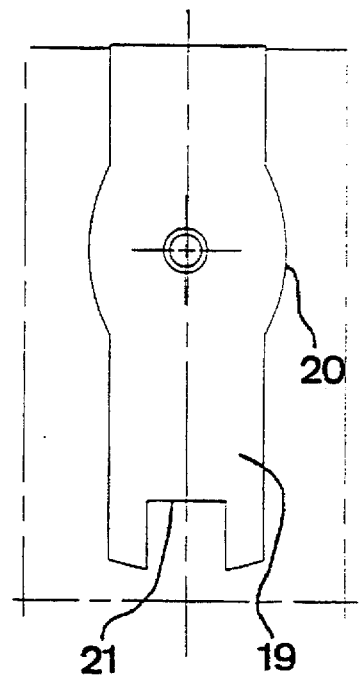
FIG. 3 is a plan view of a support pad seat in a drilling tool.
Figure 2:
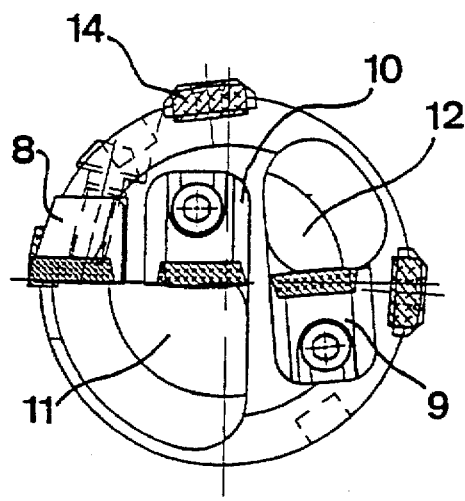
FIG. 2 is a top view of the drilling tool shown in FIG. 1.

As depicted in FIG. 3, a seat 19 is provided in the drill head for accommodating the support pad 14 according to the present invention. The seat 19 has a substantially planar bottom. The two axial delimitations have two protuberant parts 20 whose form or shape substantially corresponds to the geometrical form of the two outgrowths or wing-shaped protrusions. In this way, it is quite easy to position the support pad 14 axially in the predetermined, desired position. To further facilitate the introduction of the support pad 14 into the seat, the latter may be provided with an axial lower abutment 21.

By the thus described construction of the support pad 14 and the support pad seat, a number of advantages are attained. By virtue of the two wing-shaped protrusions 16, a stronger support pad is obtained, particularly around the weakening that the through-hole 18 causes. This means, inter alia, that the support pad 14 can be made entirely of cemented carbide—a result which has not been possible according to the construction described in SE-C-347 450.

Another advantage is that the axial abutment surfaces of the support pad consist of the contact surfaces between the wing-shaped protrusions 16 and the corresponding outgrowths 20 (the abutment 21 being optional). This provides a distinct advantage for damaged support pads. That is, a support pad which has been damaged at its one end may be loosened and turned one-half a revolution, since the short side does not have to function as an abutment surface.

Further, by means of the underlying shim layers of different thicknesses, different diameters may easily be set. These have then a plan view which substantially corresponds to that of the support pad and are laid under the support pad as a distance element. Besides, the whole support pad seat 19 can easily be made with only one end mill. A further advantage is that the whole support pad may be coated by a known PVD (Physical Vapour Deposition) or CVD (Chemical Vapour Deposition) technique.

Another advantage is that compacting the cemented carbide powder is easier at the pressing of the support pads since the cross-sectional area is about the same along the whole length of the pad.

The principles, preferred embodiments and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such changes, variations and equivalents which fall within the scope of the present invention as defined in the claims be embraced thereby.

What is claimed is:

1. Support pad positionable in a seat provided in a drilling head of a drilling tool to support and guide the tool, said support pad comprising a cemented carbide body having a substantially parallelepiped shape with oppositely positioned longitudinal sides and oppositely positioned lateral sides, a pair of protrusions each extending laterally from a respective one of said longitudinal sides at a position intermediate the lateral sides of the body, and a through hole extending through the body to fix the support pad on a drilling head.

2. Support pad according to claim 1, wherein each protrusion possesses a shape of a segment of a circle.

3. Support pad according to claim 2, wherein each protrusion possesses a length as measured along the longitudinal extent of the support pad that is between ¼ and ½ of the length of the longitudinal side.

4. Support pad according to claim 1, wherein an upper surface of the support pad is cylindrically rounded.

5. Support pad according to claim 2, wherein an upper surface of the support pad is cylindrically rounded.

6. Support pad according to claim 3, wherein an upper surface of the support pad is cylindrically rounded.

7. Support pad according to claim 1, wherein said through hole is centrally located in the support pad.

8. Support pad according to claim 2, including a centrally located through hole extending through the support pad.

9. Support pad according to claim 1, wherein each protrusion has a curved shape.

10. Support pad according to claim 1, wherein each protrusion possesses a length as measured along the longitudinal extent of the support pad that is between ¼ and ½ of the length of the respective longitudinal side.

11. Support pad according to claim 1, wherein an upper surface of the support pad is rounded.

12. Support pad according to claim 1, wherein said support pad body has a first thickness and said lateral protrusions have a second thickness, the first thickness of said support pad body being greater than the second thickness of said lateral protrusions.

13. Support pad according to claim 1, wherein a radial outer side of said support pad body is rounded.

14. Support pad according to claim 1, wherein the longitudinal sides and the lateral sides of said support pad body intersect along a plurality of edge lines of said support pad body, at least some of said edge lines being bevelled.

15. Support pad according to claim 1, wherein the support pad is entirely made of cemented carbide.

16. A drill for drilling a drill hole in a work piece, comprising a drill head, at least one cutting insert seat provided on the drill head for accommodating a cutting insert, a support pad seat provided on the drill head, and a support pad accommodated in the support pad seat for supporting and guiding the drill, said support pad being comprised of a cemented carbide body of a substantially parallelepiped shape with oppositely positioned longitudinal sides, and a protrusion extending laterally from each of said longitudinal sides, said side protrusions contacting a portion of said support pad seat on the drill head to thereby define an axial abutment surface of said support pad.

17. The drill according to claim 16, wherein said support pad seat includes two protuberances which each receive one of said protrusions.

18. The drill according to claim 16, including a hole extending through the support pad.

* * * * *